Nov. 21, 1967  W. C. BECKER  3,353,326
METHOD OF MAKING A CARRYING CASE FOR BOTTLES OR THE LIKE
Filed Feb. 1, 1965  4 Sheets-Sheet 1

INVENTOR.
WILLIAM C. BECKER

BY *Glenn, Palmer*
*& Matthews*
HIS ATTORNEYS

Nov. 21, 1967　　　W. C. BECKER　　　3,353,326
METHOD OF MAKING A CARRYING CASE FOR BOTTLES OR THE LIKE
Filed Feb. 1, 1965　　　　　　　　　　　　4 Sheets-Sheet 3

INVENTOR.
WILLIAM C. BECKER
BY Glenn, Palmer
 Matthews
HIS ATTORNEYS

Nov. 21, 1967     W. C. BECKER     3,353,326
METHOD OF MAKING A CARRYING CASE FOR BOTTLES OR THE LIKE
Filed Feb. 1, 1965     4 Sheets-Sheet 4

INVENTOR.
WILLIAM C. BECKER

BY

HIS ATTORNEYS

United States Patent Office 3,353,326
Patented Nov. 21, 1967

3,353,326
METHOD OF MAKING A CARRYING CASE
FOR BOTTLES OR THE LIKE
William C. Becker, Henrico County, Va., assignor to
Reynolds Metals Company, Richmond, Va., a corporation of Delaware
Filed Feb. 1, 1965, Ser. No. 429,572
4 Claims. (Cl. 53—24)

ABSTRACT OF THE DISCLOSURE

This disclosure relates to a method for making a package construction wherein a plurality of bottles or the like are disposed in an open ended tray-like receptacle with the product-filled tray means being received in a heat shrinkable tubular film-like member that is subsequently heat shrunk around the product-filled receptacle means to tightly compact the same together, the film-like member having opening means formed therein and through which projection means of the product means project for stabilizing the product means in the receptacle means. Such opening means are formed in the film-like tubular member by heat that forms an annular bead around each resulting opening to reinforce the same so that the respective projecting portion of the product means will not readily tear the film-like member at such opening means.

This invention relates to an improved package construction as well as to an improved method of making such a package construction or the like.

It is well known that beverage bottles and the like are merchandised in sets of four, six, eight or twelve bottles normally disposed in a rectangular cardboard receptacle having means for carrying the entire package construction.

According to the teachings of this invention, an improved package construction for bottles or the like is provided wherein the bottles are completely stabilized in the package construction while the package construction adds considerable sales appeal to the product.

In particular, this invention provides an open ended substantially rectangular receptacle receiving a plurality of bottles in the open end thereof with the necks of the bottles projecting above the upper edge of the receptacle. The filled receptacle is disposed in a heat shrinkable tubular film-like member which has openings receiving the necks of the bottles so that when the film-like material is heat shrunk, the same compacts the bottles and receptacle together to provide a unique and novel package construction.

Accordingly, it is an object of this invention to provide an improved package construction having one or more of the novel features set forth above or hereinafter shown or described.

Another object of this invention is to provide an improved method of making such a package construction or the like.

Other objects, uses and advantages of this invention are apparent from a reading of this description which proceeds with reference to the accompanying drawings forming a part thereof and wherein.

Figure 1:
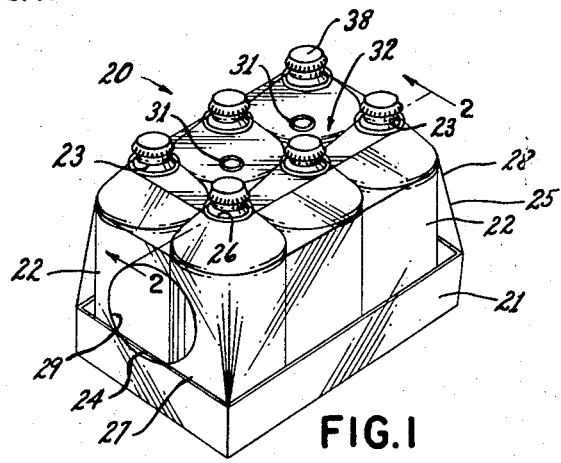
FIGURE 1 is a perspective view of an improved package construction of this invention.

While the various features of this invention are hereinafter described and illustrated as being particularly adaptable for providing a package construction for beverage bottles or the like, it is to be understood that the various features of this invention can be utilized singly or in any combination thereof to provide package constructions for other product means which have projection means as will be apparent hereinafter.

Therefore, this invention is not to be limited to only the embodiment illustrated in the drawings, because the drawings are merely utilized to illustrate one of the wide variety of uses of this invention.

Figure 2:
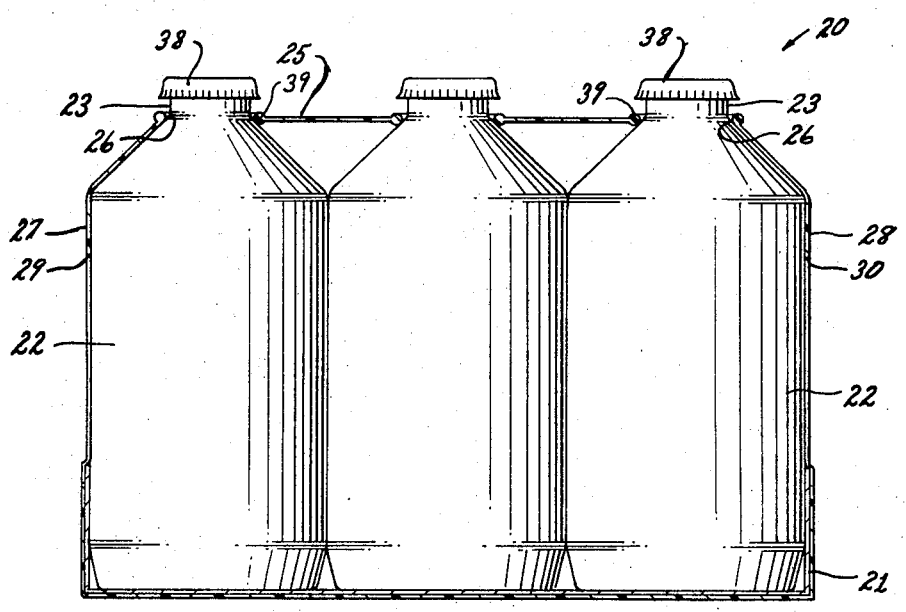
FIGURE 2 is an enlarged cross-sectional view taken on line 2—2 of FIGURE 1.

Referring now to FIGURES 1 and 2, an improved package construction of this invention is generally indicated by the reference numeral 20 and comprises a substantially rectangular open ended receptacle 21 receiving a plurality of beverage bottles 22 of the like which have the necks 23 thereof projetcing above the upper edge 24 of the receptacle 21, the filled receptacle 21 being disposed in a heat shrunk tubular film-like member 25 having openings 26 provided therein and through which the necks 23 of the bottles 22 project so that the film-like material 25 compacts the bottles 22 and receptacle 21 together while stabilizing the bottles 22 relative to the receptacle 21 by means of the openings 26 thereof cooperating with the necks 23 of the bottles 22.

The heat shrunk tubular member 25 has opposed ends 27 and 28 respectively overlapping the opposed ends of the filled receptacle 21 and respectively defining openings 29 and 30 through which the ultimate consumer or the like can reach a thumb in between adjacent bottles 22 while the remainder of the hand is disposed underneath the encased receptacle 21 for easy carrying of the package construction 20.

Alternatively, or additionally, the film-like member 21 can have finger holds 31 formed therethrough and respectively aligned with spaces 32 defined between each set of four bottles 22 whereby the ultimate consumer or the like can insert a thumb in one of the holes 31 and a forefinger in the other hole 31 in order to carry the package construction 20.

While the package construction 20 can be formed of any suitable material and in any suitable manner, the receptacle 21 is formed of cardboard or the like and the film-like material 25 is formed of polyethylene, polypropylene or the like which has the heat shrinking or resilient characteristic to tightly compact the bottles 22 and receptacle 21 together.

However, it has been found that when the film-like material 25 is formed of polyvinylchloride, the same has a relatively good impact resistance and when punctured, will not split and tear.

For example, the film-like material 25 can be formed of two webs of oriented polyvinylchloride fused together to provide a lamination suitable for the features of this invention.

When the film-like material 25 is transparent, it can be seen that the informational and advertising media not only on the bottles 22 but also on the receptacle 21 can be readily viewed by the ultimate consumer and the same will have a glossy effect produced by the film-like material 25 whereby increased sales appeal for the package construction 20 will be provided.

One method for forming the package construction 20 of FIGURE 1 will now be described and reference is made to FIGURES 3–10.

Figure 3:
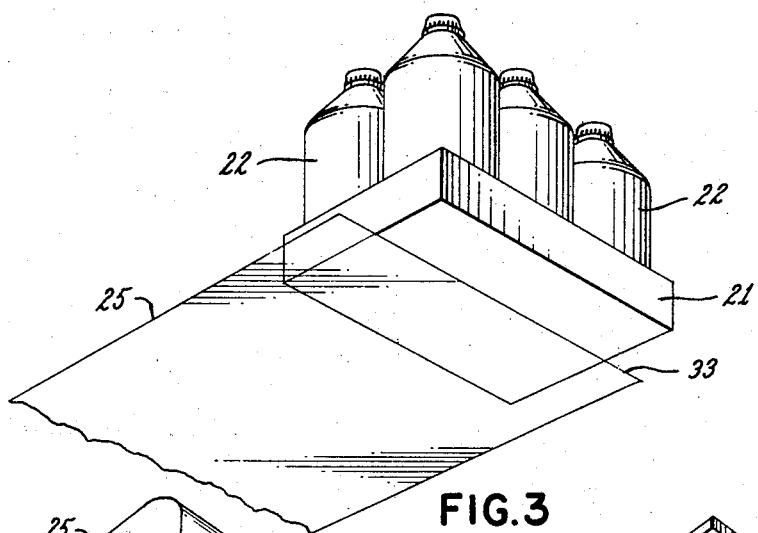
FIGURE 3 is a perspective view illustrating one step in the method of forming the package construction of FIGURE 1.
Figure 4:
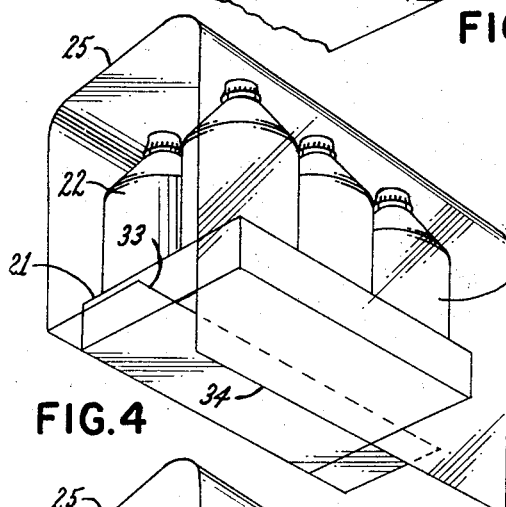
FIGURES 4–6 are views similar to FIGURE 3 and illustrates respectively other steps in the method of this invention.
Figure 5:
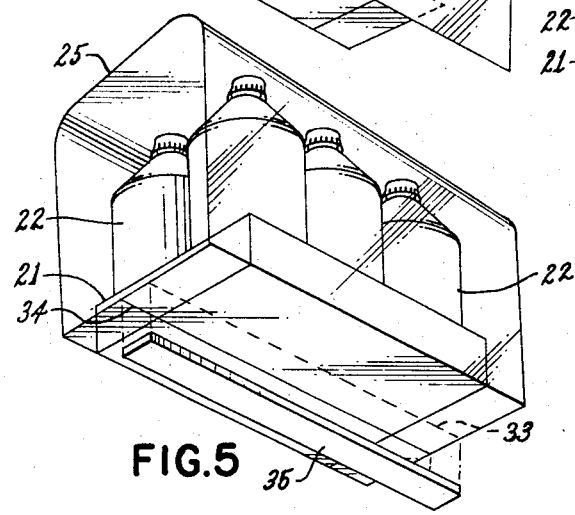

In particular, the bottles 22 are placed in the open end of the receptacle 21 in the manner illustrated in FIGURE 3 and a sheet of film-like material 25 is wrapped around the same with the opposed end edges 33 and 34 thereof disposed in overlapping relation in the manner illustrated in FIGURE 5 against the bottom of the receptacle 21 whereby a suitable heater bar 35 can be utilized to heat seal the overlapping edges 33 and 34 together to provide a complete tubular member encasing the filled receptacle 21.

Figure 6:
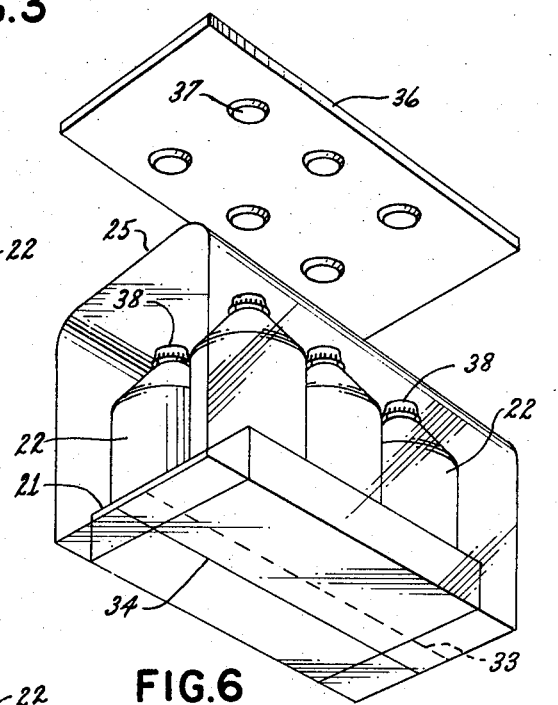
Figure 7:
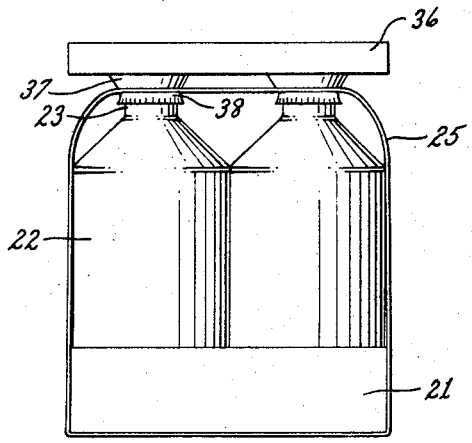
FIGURE 7 is an end view of the partially formed package construction of this invention and illustrates another step in the method of making the same.
Figure 8:
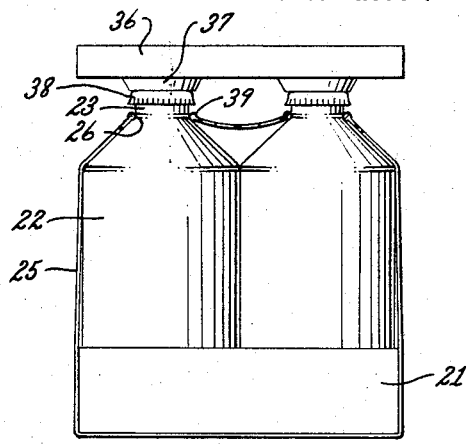
FIGURE 8 is a view similar to FIGURE 7 and illustrates the method of forming the neck receiving openings in the film-like member of this invention.
Figure 9:
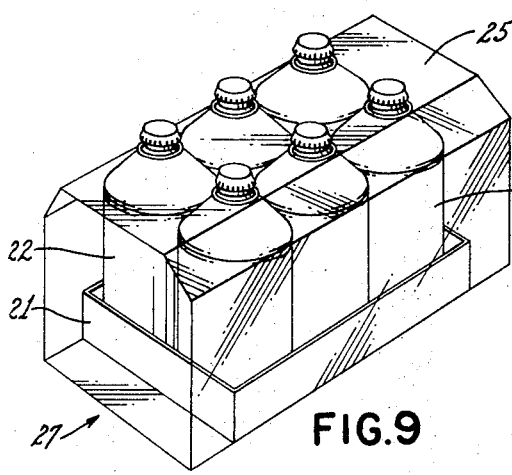
FIGURE 9 is a perspective view of the structure illustrated in FIGURE 8 with the die means removed.

Thereafter, a heated mandrel 36 having projections 37 complementary to the top closures 38 of the bottles 22 is lowered downwardly from the position illustrated in FIGURE 6 to the position illustrated in FIGURE 7 to compact the film-like material between the flat mandrels 37 and the bottle caps 38 whereby the heat burns holes 26 through the film-like material 25 which corresponds to the necks 23 of the bottles 22 and causes the film-like material to preshrink in the manner illustrated in FIGURE 8 so that the necks 23 of the bottles 22 project through the openings 26.

It has been found that when the openings 26 are burned in the film-like material 25, the film-like material 25 forms bead-like structures 39 which surround the holes 26 and reinforce the peripheral edges thereof in the manner illustrated in FIGURES 2 and 8.

Figure 10:
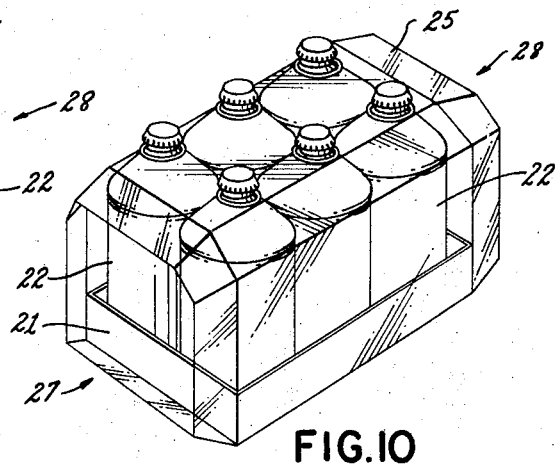
FIGURE 10 is a view similar to FIGUR7 9 and illustrates the method of preshrinking the ends of the tubular film-like member.

Thereafter, the opposed ends 27 and 28 of the tubular film-like member 25 are preshrunk in the manner illustrated in FIGURE 10 so that the ends 27 and 28 partially overlap the opposed ends of the filled receptacle 21.

Subsequently, the partially completed package construction of FIGURE 10 is passed through a heating chamber or the like wherein the heat in the chamber causes complete heat shrinking of the film-like material 25 into the position illustrated in FIGURE 1 whereby the film-like material 25 tightly compacts the bottles 22 and receptacle 21 together to provide the unique and novel package construction previously described.

Either before the film-like material 25 is wrapped around the filled receptacle 21 or thereafter, the finger holes 31 can be formed therein by a burning operation or die cutting operation in a manner hereinafter described whereby when the finger holes 31 are burned therein, the same have bead structures surrounding the peripheral edge thereof to reinforce the same in the same manner as the bead structures 39 previously described.

While the package construction 20 of this invention has been described as having the neck receiving openings 26 formed therein after the sheet of heat shrinkable material 25 has been wrapped around the filled receptacle 21, it is to be understood that the bottle receiving openings 26, as well as the finger receiving openings 31, could be formed in the material 25 before the same has been wrapped around the filled receptacle 21.

Figure 11:
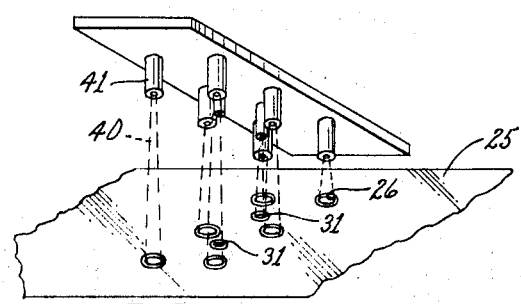
FIGURE 11 is a perspective view and illustrates another method of this invention for forming the openings in the film-like member of this invention.

For example, reference is made to FIGURE 11 wherein a sheet of heat shrinkable material 25 is provided in flat form and the bottle receiving openings 26 and finger receiving openings 31 are burned therein by jets of hot air 40 being directed toward the sheet of material 25 by suitable nozzle means 41.

Figure 12:
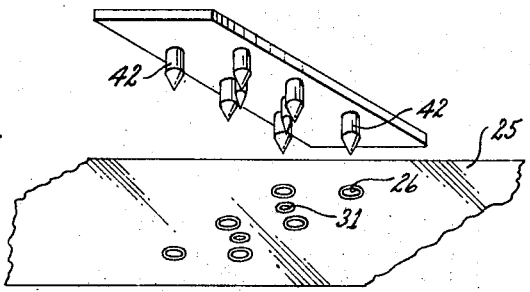
FIGURE 12 is a view similar to FIGURE 11 and illustrates another embodiment of this invention.

Alternately, the finger holes 31 and bottle receiving openings 26 can be formed in the sheet of material 25 by pressing tapering heated mandrel means 42 into the material 25 in the manner illustrated in FIGURE 12.

Figure 13:
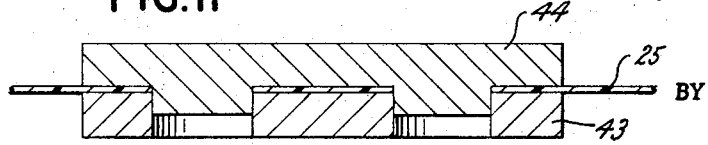
FIGURE 13 is an enlarged, fragmentary, cross-sectional view illustrating another method of forming the openings in the film-like member.

If it is desired to form bottle receiving opening 26 and finger holes 31 without the reinforcing bead structures 39 previously described, the openings 26 and 31 can be formed in the sheet of material 25 by cooperating female die means 43 and male die means 44 in the manner illustrated in FIGURE 13.

Figures 14, 15, 16, 17:
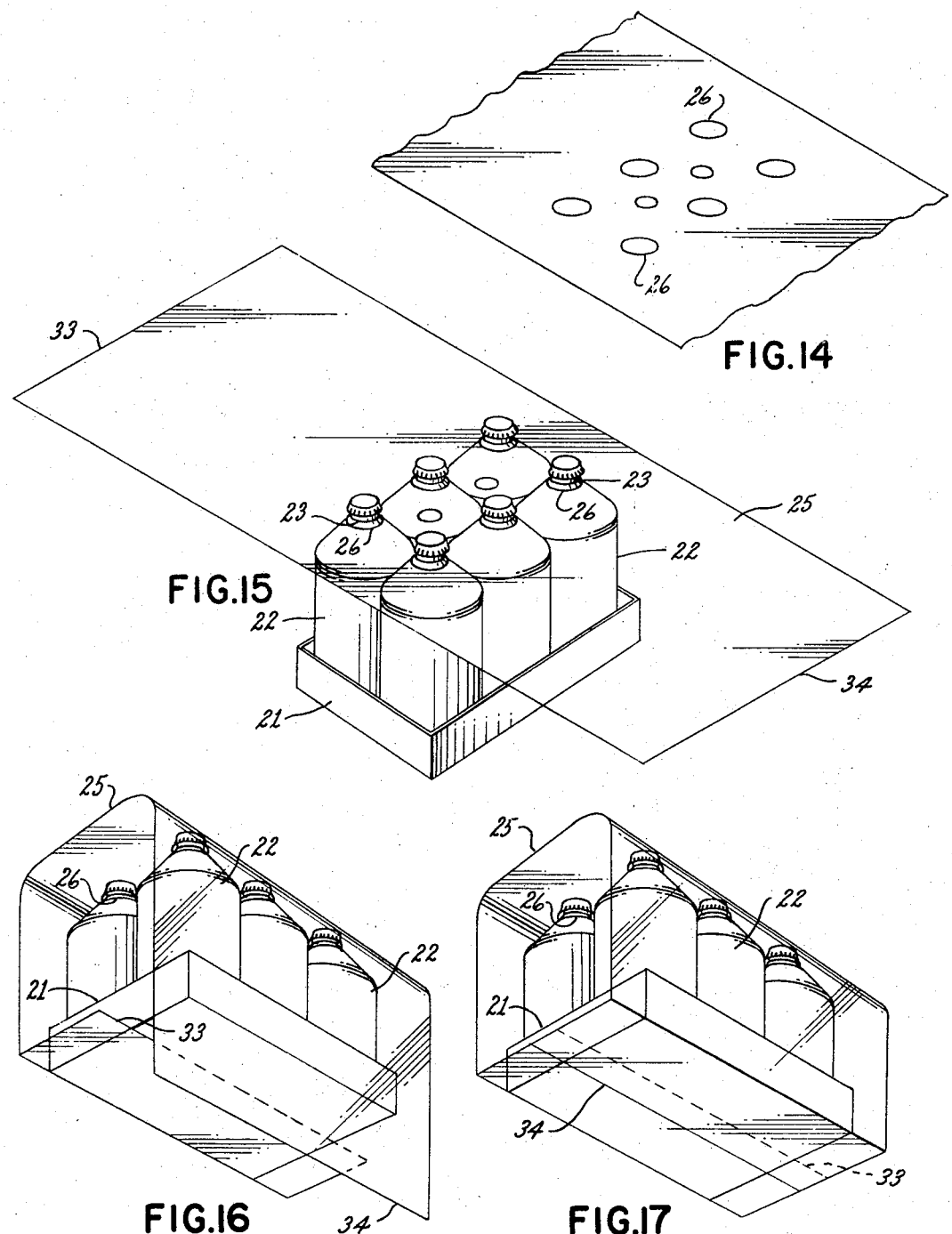
FIGURE 14 is a fragmentary, perspective view illustrating the film-like member with the preformed openings therein.
FIGURES 15–17 are respectively perspective views illustrating the method of forming a package construction from the film-like material of FIGURE 14.

When the bottle receiving openings 26 are formed in the sheet of material 25 before the same is wrapped around the filled receptacle means 21 in the manner illustrated in FIGURES 11–13, the preformed sheet of material 25 takes the shape illustrated in FIGURE 14 and is adapted to be disposed over the filled receptacle means 21 in the manner illustrated in FIGURE 15 whereby the necks 23 of the bottles 22 project through the openings 26.

Thereafter, the opposed end edges 33 and 34 of the preformed sheet of material 25 is wrapped around the filled receptacle in the manner illustrated in FIGURE 16 whereby the ends 33 and 34 are disposed in overlapping relation in the manner illustrated in FIGURE 17 and heat sealed together by the heater bar 35 previously described. The partially completed package construction of FIGURE 17 can be completed by preshrinking the ends in the manner illustrated in FIGURE 10 and passing the same through a heating chamber to form a package construction similar to the package construction 20 illustrated in FIGURE 1.

Therefore, it can be seen that the completed package constructions of this invention causes the heat shrinkable film-like material 25 to tightly compact the bottles 22 and receptacle 21 together with the bottles 22 being stabilized relative to the receptacle 21 by means of the neck receiving openings 26 in the film-like material 25.

Accordingly, it can be seen that this invention not only provides an improved package construction or the like, but also this invention provides an improved method for making such a package construction or the like.

While the form of the invention now preferred has been disclosed as required by the statutes, other forms may be used, all coming within the scope of the claims which follow.

What is claimed is:

1. A method for making a package construction comprising the steps of providing product means having projection means, encasing said product means in a heat shrinkable film-like member, and thereafter, heat shrinking said film-like member around said product means to compact and encase said product means therein, and forming opening means through said film-like member during part of said heat shrinking step and through which said projection means will subsequently project to stabilize said product means relative to said film-like member.

2. A method as set forth in claim 1 and including the step of forming a bead structure on said film-like member during said part of said heat shrinking step and which surrounds said opening to reinforce the peripheral edge thereof.

3. A method for making a package construction comprising the steps of providing an open ended tray-like receptacle, disposing a plurality of bottles in said receptacle so that the necks of said bottles project above said receptacle, disposing said bottle filled receptacle in a heat shrinkable tubular film-like member, and, thereafter, heat shrinking said tubular film-like member around said filled receptacle, and forming openings through said film-like member during part of said heat shrinking step and through which said necks of said bottles will subsequently project whereby said film-like member compacts and holds said bottles and said receptacle together.

4. A method as set forth in claim 3 and including the step of forming a bead structure on said film-like member during said part of said heat shrinking step and surrounding each opening to reinforce the peripheral edge thereof.

References Cited
UNITED STATES PATENTS

| | | | |
|---|---|---|---|
| 3,092,439 | 6/1963 | Harrison | 264—342 |
| 3,118,537 | 1/1964 | Copping | 206—65 |
| 3,195,771 | 7/1965 | Denenberg | 220—116 |
| 3,260,358 | 7/1966 | Cottily et al. | 206—46 |

LOUIS G. MANCENE, *Primary Examiner.*